US009924406B2

(12) United States Patent
Yang et al.

(10) Patent No.: US 9,924,406 B2
(45) Date of Patent: Mar. 20, 2018

(54) BLENDED DATA TRANSMISSION NETWORK FOR MACHINE TYPE COMMUNICATIONS (71) Applicant: Verizon Patent and Licensing Inc., Arlington, VA (US)

(72) Inventors: Jin Yang, Orinda, CA (US); Jingyi Zhou, Belle Mead, NJ (US); Sanyogita Shamsunder, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 428 days.

(21) Appl. No.: 14/635,222

(22) Filed: Mar. 2, 2015

(65) Prior Publication Data
US 2016/0262045 A1 Sep. 8, 2016

(51) Int. Cl.
*H04W 48/10* (2009.01)
*H04W 48/18* (2009.01)
*H04W 48/16* (2009.01)
*H04W 28/02* (2009.01)
*H04W 16/04* (2009.01)
*H04W 4/00* (2009.01)
*H04W 4/14* (2009.01)
*H04W 84/04* (2009.01)

(52) U.S. Cl.
CPC ....... *H04W 28/0289* (2013.01); *H04W 4/005* (2013.01); *H04W 4/14* (2013.01); *H04W 16/04* (2013.01); *H04W 28/0215* (2013.01); *H04W 48/10* (2013.01); *H04W 48/16* (2013.01); *H04W 48/18* (2013.01); *H04W 84/042* (2013.01)

(58) Field of Classification Search
CPC ... H04W 72/042; H04W 68/02; H04W 4/005; H04W 4/00; H04L 12/4633; H04L 12/5895; H04L 51/38; H04L 2212/00
See application file for complete search history.

(56) References Cited

U.S. PATENT DOCUMENTS

| 2008/0200146 | A1* | 8/2008 | Wang | H04J 11/0069 455/410 |
| 2012/0282956 | A1* | 11/2012 | Kim | H04L 51/38 455/466 |
| 2013/0155954 | A1* | 6/2013 | Wang | H04W 4/005 370/328 |
| 2013/0303206 | A1* | 11/2013 | Starsinic | H04W 4/005 455/466 |

(Continued)

*Primary Examiner* — Redentor Pasia
*Assistant Examiner* — Peter Mak (57) ABSTRACT A method includes broadcasting, from an evolved node b (eNodeB), a plurality of Public Land Mobile Networks (PLMN) identifiers (IDs). The plurality of PLMN-IDs include at least one PLMN-ID for a data intensive network and at least one M-PLMN-ID for machine type communications (MTC) in a short messaging network. The method includes receiving a request to transmit MTC data from a MTC device and determining whether the MTC device includes the at least one M-PLMN-ID. The method includes determining whether the MTC data is in a class required to be sent by the data intensive network. The method also includes determining whether the message size is less than the length of structured small data (SSD), and sending the message via the short messaging network in response to a determination that the message size is less than the length of the SSD.

20 Claims, 8 Drawing Sheets (56) References Cited

U.S. PATENT DOCUMENTS

| | | | |
|---|---|---|---|
| 2014/0315554 A1* | 10/2014 | Hapsari | H04W 48/02 455/436 |
| 2015/0109995 A1* | 4/2015 | Mathai | H04W 48/18 370/328 |
| 2015/0373733 A1* | 12/2015 | Bangolae | H04W 36/14 370/329 |
| 2016/0192408 A1* | 6/2016 | Martinez Tarradell | H04W 24/02 370/329 |

* cited by examiner

BLENDED DATA TRANSMISSION NETWORK FOR MACHINE TYPE COMMUNICATIONS

BACKGROUND

Machine to machine communication (M2M) allows (wireless and/or wired) systems to communicate with other devices without manual human interaction. M2M communication may include a wide range of applications for interaction between devices, such as monitoring and control for industrial automation, logistics, Smart Grid, Smart Cities, health, defense, etc. The data transferred during M2M communications may include different types and sizes that may be associated with different applications. For example, M2M communications may include short message, multimedia, etc.

M2M communications may be transmitted over high-speed data transmission networks, such as a third generation partnership project (3GPP) network. 3GPP is a partnership of multiple telecommunications standard development organizations (e.g., the Association of Radio Industries and Businesses (ARIB), Alliance for Telecommunication Industry Solutions (ATIS), China Communications Standards Association (CCSA), European Telecommunications Standard Institute (ETSI), etc.), known as "Organizational Partners". 3GPP provides complete system specifications that cover cellular telecommunications network technologies, including radio access, the core transport network, and service capabilities (e.g., work on codecs, security, quality of service, etc.). 3GPP specifications also cover non-radio access to the core network, and interworking with Wi-Fi networks.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may be implemented to provide a blended data transmission network that supports and routes machine type communications (MTC) through different constituent networks of the blended data transmission network. The blended data transmission network may include a short messaging network for structured small data (SSD) that provides delivery of short message size MTC data and a data intensive network that may deliver large message size data. The networks may include Public Land Mobile Networks (PLMNs), for example a long term evolution (LTE) network. The message sizes may be defined by the network operator based on particular message size thresholds, applications, etc.

Consistent with embodiments, an intelligent eNodeB may direct messages from M2M devices based on routing function for messages that include PLMN IDs associated with the different networks, such as a PLMN-ID for large messages delivered via the data intensive network and a machine PLMN (M-PLMN) for short size messages delivered via the short messaging network. The system may perform network resource partitioning and congestion control through PLMN-IDs, access codes and quality of service class indicators (QCIs).

Consistent with embodiments, the systems may support a blended data transmission network that includes the data intensive network, the short messaging network and an additional network provided separate from the LTE networks, such as a wireless LAN (WLAN)/Personal Area Network (PAN). The systems and methods may integrate the machine type communications to efficiently support MTC devices, such as various consumer and industrial devices which may be deployed within the Internet of Things (IoT).

Figure 1:
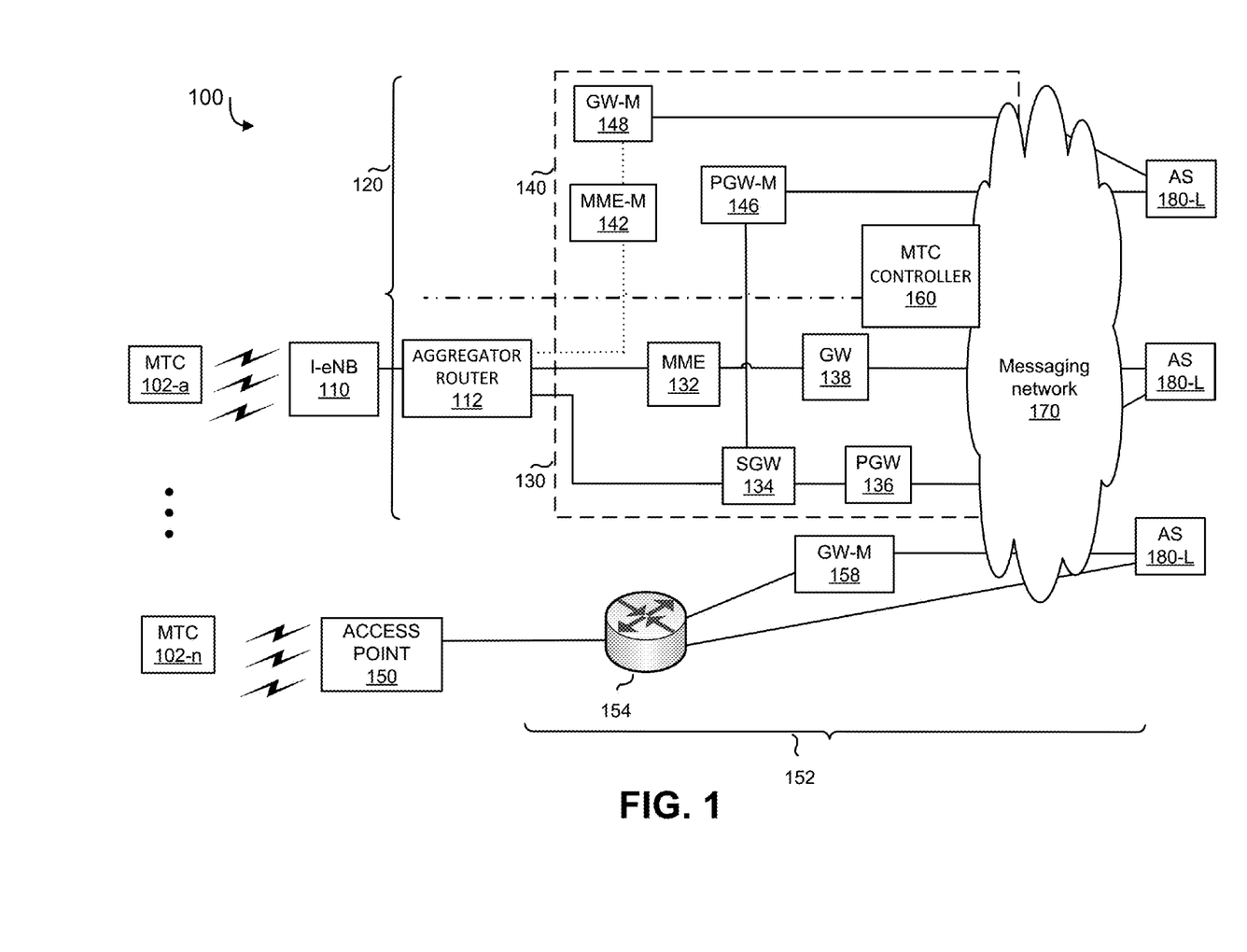
FIG. 1 is an exemplary blended data transmission network in which systems and/or methods described herein may be implemented.

FIG. 1 is a diagram of an exemplary blended data transmission network 100. As illustrated, blended data transmission network 100 includes a number of machine type communication (MTC) devices (shown as MTC 102a-n, collectively referred to as MTCs 102 or individually as MTC 102), a number of eNodeBs or enhanced node base stations (collectively referred to as intelligent eNodeBs 110 or individually as intelligent eNodeB 110), a blended evolved packet core (EPC) network 120, an access point 150, a secondary network 152, an MTC controller 160, a messaging aggregation network 170 and a plurality of application servers (AS) 180. Although not shown, network 100 may include additional devices, such as a home subscriber server (HSS)/authentication, authorization, and accounting (AAA) server, a policy and charging rules function (PCRF) device, etc., and additional networks, such as a packet data network (PDN), (e.g., the Internet or a proprietary packet data network). Devices/networks of network 100 may interconnect via wired and/or wireless connections.

MTC 102 may include a device that communicates with another device via machine to machine communications that does not include manual human input. MTC 102 may perform machine to machine (M2M) or machine type communications. MTC 102 may communicate via wireless and/or wired networks. MTC 102 may include a wide range of applications for monitoring and control purposes in fields such as industrial automation, logistics, Smart Grid, Smart Cities, health, defense, etc. MTC 102 operates according to one or more versions of the LTE communication standard. Alternatively, or additionally, MTC 102 may operate according to a wireless standard for communications via secondary wireless network.

Intelligent eNodeBs 110 may include network devices that operate according to one or more versions of the LTE communication standard and direct MTC communications in the blended data transmission network 100 based on size related aspects of the MTC communication. For example, intelligent eNodeBs 110 may be configured to respond to MTC 102 requests, forward information regarding MTCs 102 to devices in either of the constituent networks of blended EPC network 120 (i.e., an enhanced LTE network), etc. Intelligent eNodeBs 110 may route data for M2M communications between the networks 130/140 as described below with respect to FIGS. 3, 4 and 5.

Blended EPC network 120 may be a blended data transmission network that operates according to the LTE standard and includes different constituent networks that may be used to transmit different classes of MTC data based on size related criteria, such as the actual size of the data and the general sizes of data that are generally transmitted in association with a particular application. Intelligent eNodeBs 110 may direct messaging through blended EPC network 120 via aggregator router 112. Blended EPC network 120 may include a data intensive network 130 and a short messaging network 140 for structured small data (SSD).

Data intensive network 130 may include a network that transmits large message sizes for machine type communications between MTCs 102. For example, data intensive network 130 may include a cellular network built for data intensive applications that is utilized for machine type communications that include large data sizes. Data intensive network 130 may include mobility management entity (MME) 132, a serving gateway (SGW) 134, a packet data network (PDN) gateway (PGW) 136, and a gateway (GW) 138.

MME 132 is responsible for idle mode tracking and paging procedures (e.g., including retransmissions) for MTCs 102. For example, MME 132 maintains information regarding a current state (e.g., powered on, location, etc.) of each particular MTC 102. MME 132 is also involved in the bearer activation/deactivation process (e.g., for MTC 102a) and operates to choose a particular SGW 134 for MTC 102 at an initial attach time and at a time of intra-LTE handover. In addition, MME 132 authenticates MTCs 102 (e.g., via interaction with HSS 122). Non-access stratum (NAS) signaling terminates at MME 132 and MME 132 generates and allocates temporary identities to MTCs 102.

SGW 134 routes and forwards user data packets, acts as a radio mobility anchor for a user plane during inter-eNodeB handovers, and also acts as an radio anchor for mobility between LTE and other 3GPP technologies (referred to as "inter-3GPP mobility"). As shown, SGW 134 is connected to intelligent eNodeBs 110 (and other eNodeBs) to provide a radio layer mobility control plane. In addition, SGW 134 manages and stores contexts associated with MTC 102 (e.g., parameters of an IP bearer service, network internal routing information, etc.).

PGW 136 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 136 provides connectivity of MTC 102 to external packet data networks (e.g., to PDN) by being a traffic exit/entry point for MTC 102. As described briefly above, MTC 102 may connect to PGW 136 via one or more tunnels established between eNB 110 and PGW 136, such as one or more GPRS Tunneling Protocol (GTP) tunnels. MTC 102 may simultaneously connect to more than one PGW for accessing multiple PDNs. PGW 136 may perform policy enforcement, packet filtering for each user, charging support, lawful intercept, and packet screening. PGW 136 may also act as an anchor for mobility between 3GPP and non-3GPP technologies.

GW 138 may send/broadcast packets to each intelligent eNodeB 110 transmitting the MTC data for large size data. GW 138 may be part of another network element, such as a router, etc. GW 138 may use IP multicast to forward MTC data to intelligent eNodeB 110. GW 138 may perform session control signaling (e.g., session start/stop) towards the evolved universal terrestrial radio access network (E-UTRAN) via MME 132).

Intelligent eNodeB 110 may forward information regarding MTCs 102 to MME 132 and/or SGW 134, set up tunneling sessions with other devices (e.g., SGW 134 and PGW 136), etc. Intelligent eNodeB 110 may also perform similar operations for corresponding devices in short messaging network 140. MTCs 102 may transmit MTC data via intelligent eNodeB 110 and an aggregator router 112 to messaging aggregation network 170 and an application server 180 via any of data intensive network 130, short messaging network 140, or access point 150.

Short messaging network 140 may include a messaging network optimized for M2M to send short messages. Data transmission for small data sizes may be inefficient for machine type communication in data intensive network 130. The short messages may be identified based on a maximum data size of each individual message, e.g. 250 kilobits (kb), or a particular application associated with the transmitted MTC data. Short messaging network 140 may support M2M communication using the small data sizes (e.g., 250 type short message service (SMS)) by routing small data from MTCs 102 either based on a separate machine type communications network (MTCN) ID or through existing MME but adding machine gateway.

Short messaging network 140 may include E-UTRAN and devices that support transmission of short size data through the corresponding portion of the LTE network including an MME-M 142, a PGW-M 146, and a GW-M 148, in which the suffix "M" designates the particular network components as part of the short messaging network dedicated to transmitting short size data. These devices may perform in a similar manner to corresponding devices in data intensive network 130 (e.g., MME-M 142 may perform in a similar manner as MME 132, described herein above) but may be dedicated to short message data transmission for machine type communications. MME-M 142 may include a control plane function similar to and may also be used as data plane function to deliver short message data for MTC.

According to an embodiment, short messaging network 140 may include a messaging network could be based on cellular, Wi-Fi, Bluetooth™, and other access technologies or mechanisms. The data protocol between MTC 102 and components of short messaging network 140 may include a standardized data protocol, such as internet protocol (IP) between MTC 102 and GWs 138 and 148, and application layer protocol between MTC 102 and application servers, such as hypertext transfer protocol (HTTP), constrained application protocol (CoAP), extensible messaging and presence protocol (XMPP), message queue telemetry transport (MQTT), data distribution service (DDS), etc.

Access point 150 may include a device that routes and provides access to a secondary network 152 for machine type communications. For example, access point 150 may include a wireless access device that produces a wireless messaging network.

Secondary network 152 may include a wireless LAN (WLAN)/Personal Area Network (PAN). Secondary network 152 may include a mobile access gateway or target mobile access gateway (MAG/TMAG) 154 and a gateway 158 that connects via messaging aggregation network 170 to applications servers 180. Secondary network 152 may be Wi-Fi, other access technology or proprietary messaging service. Secondary network 152 may share application servers 180 with blended EPC network 120 within the framework described herein.

MTC controller 160 may broadcast a first PLMN-ID associated with the data intensive network 130 and another PLMN-ID (M-PLMN-ID) for the short messaging network 140, as described herein below with respect to FIG. 6.

Messaging aggregation network 170 may aggregate short messages derived from blended EPC network 120 and access point 150 and route the short messages to application servers 180. Messaging aggregation network 170 may provide access and interface to application servers 180 that support MTC messaging.

Application server 180 may support MTC messaging for LTE service. In one implementation, application server 180 may interact with MTCs 102 using HTTP or the secure HTTP (HTTPS). In another implementation, application server 180 and MTC 102 may interact with one another using another type of protocol.

The particular numbers (i.e., amounts) of each component or device of blended data transmission network 100 (e.g., two MTCs 102, a single intelligent eNodeB 110, MME 132, SGW 134, PGW 136, etc.) have been illustrated in FIG. 1 for simplicity. In practice, there may be more or fewer devices or components. For example, a typical network 100 includes millions of subscriber MTCs 102, thousands of intelligent eNodeBs 110, hundreds of SGWs 134, etc.

As described herein, systems and methods may implement a blended data transmission network that includes machine type communications (MTC). The blended data transmission network may include a messaging network for SSD that provides short message delivery for MTC data and a data intensive network, such as a wireless LAN (WLAN)/Personal Area Network (PAN). The networks may include a routing function for messages based on both a PLMN and a machine PLMN.

Figure 2:
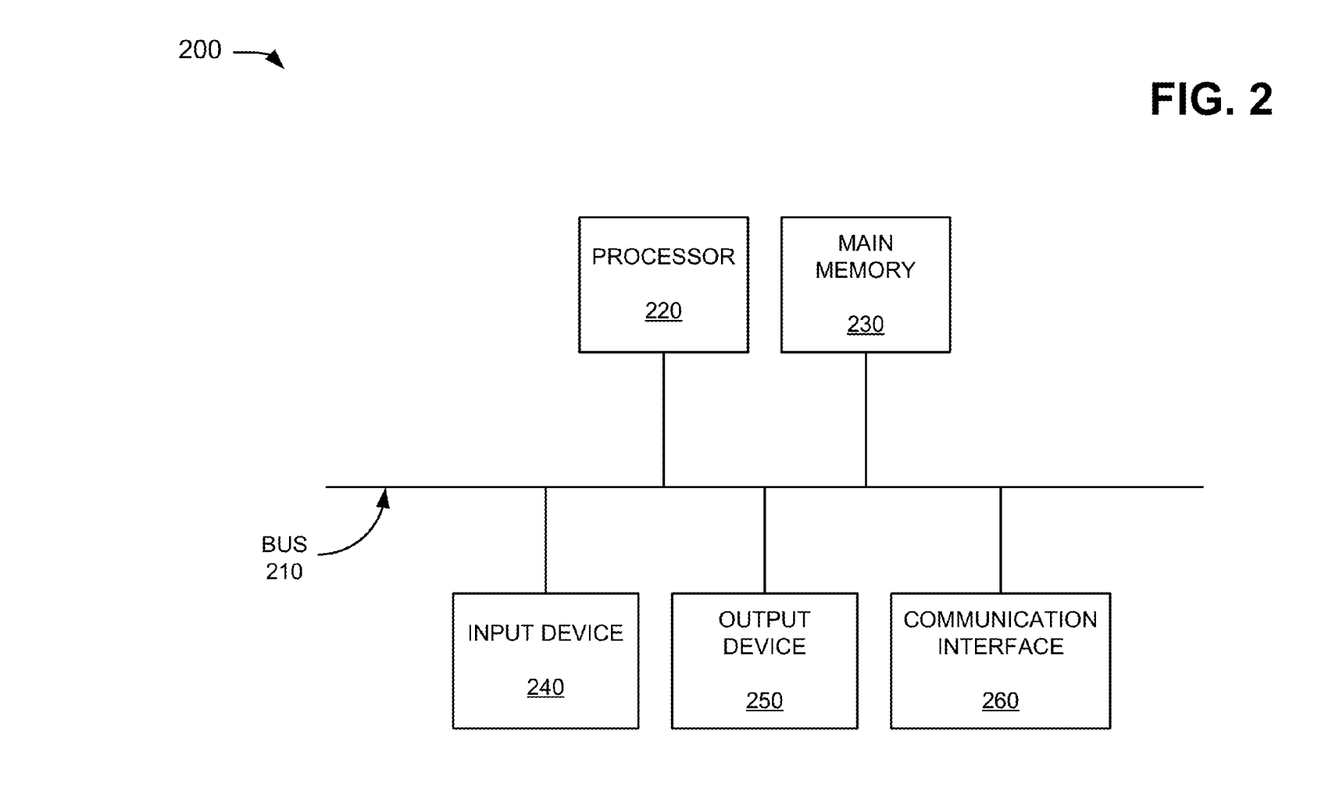
FIG. 2 is a block diagram of exemplary components of a device that may correspond to one of the devices of FIG. 1.

FIG. 2 is a diagram of exemplary components of a device 200 that may correspond to any of MTC 102, intelligent eNodeB 110, aggregator router 112, MMEs (MME 132 or MME-M 142), SGW 134, PGWs (PGW 136 or PGW-M 146), GWs (GW 138, GW-M 148, or GW-M 158), access point 150, MAG 154, MTC controller 160 and application server 180, as described in FIG. 1 above. As shown in FIG. 2, device 200 may include a bus 210, a processor 220, a memory 230, an input device 240, an output device 250, and a communication interface 260.

Bus 210 may permit communication among the components of device 200. Processor 220 may include one or more processors or microprocessors that interpret and execute instructions. In other implementations, processor 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processor 220, a read only memory (ROM) or another type of static storage device that stores static information and instructions for the processor 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include one or more transceivers that enables device 200 to communicate with other devices and/or systems. For example, communication interface 260 may include mechanisms for communicating with other devices, such as other devices of network 100.

As described herein, device 200 may perform certain operations in response to processor 220 executing software instructions contained in a computer-readable medium, such as memory 230. A computer-readable medium may include a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processor 220 to perform processes described herein. Alternatively, hard-wired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
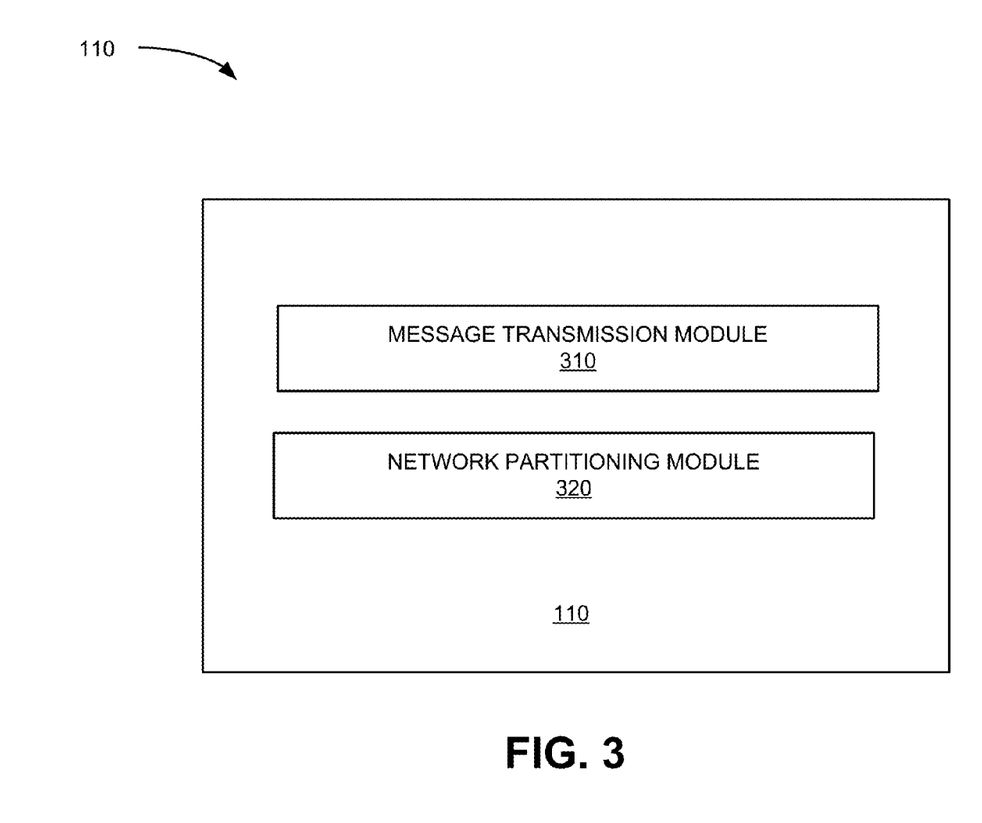
FIG. 3 is a diagram of exemplary functional components of the intelligent eNodeB of FIG. 1.

FIG. 3 illustrates an exemplary functional block diagram of intelligent eNodeB 110. Intelligent eNodeB 110 may comprise software, hardware, or a combination of hardware and software. Intelligent eNodeB 110 may include a message transmission module 310 and a network partitioning module 320. The configuration of components of intelligent eNodeB 110 illustrated in FIG. 3 is for illustrative purposes only. Other configurations may be implemented. Therefore, intelligent eNodeB 110 may include additional, fewer and/or different components than those depicted in FIG. 3.

Intelligent eNodeBs 110 are base stations in network 100 and may include control plane connections to other network elements. Intelligent eNodeB 110 may transmit messages via MME 132 of data intensive network 130 and/or MME-M 142 of short messaging network 140 based on determination whether the message fits into a short message size class. Intelligent eNodeBs 110 may set up tunneling sessions with other devices (e.g., SGW 134), etc. Intelligent eNodeBs 110 may include multicast coordination entities (MCEs) (not shown separately) that allocate radio resources used by all intelligent eNodeBs 110. Each intelligent eNodeB 110 may have an associated MCE, which may be integrated into the intelligent eNodeB 110. In addition to allocation of the time/frequency radio resources, MCEs may also determine or implement further details of the radio configuration, such as a modulation and coding scheme (MCS).

Message transmission module 310 may determine and apply rules for the transmission of machine type communication messages as described herein below with respect to FIG. 4. Message transmission module 310 may receive communication from MTCs 102 and determine whether the message is to be transmitted and by what particular network based on PLMN-IDs received from the MTC 102. Message transmission module 310 may prioritize messages based on factors such as PLMN-ID, access code and quality of service class indicator (QCI). For example, access codes 11 to 15 may be designated for emergency service. In other instances, access codes may be allocated for MTC, etc. QCI determines the forwarding treatment, including scheduling weights, admissions thresholds, etc.) for traffic between MTCs 102 and the gateways (e.g., GW 138).

Network partitioning module 320 may execute network resource partitioning and congestion control as described hereinbelow with respect to FIG. 5. Network partitioning module 320 may monitor and measure network conditions based on predetermined thresholds and use the network conditions to determine system loading.

Figure 4:
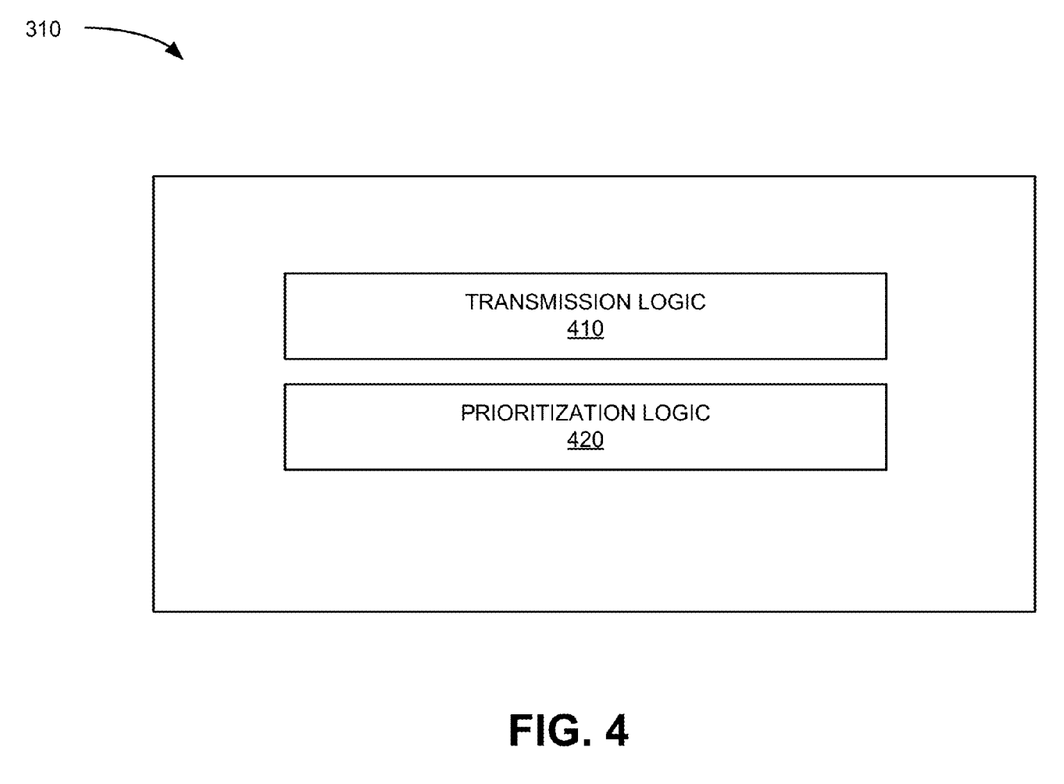
FIG. 4 depicts a functional block diagram of the message transmission module of FIG. 3.

FIG. 4 is an exemplary functional block diagram of message transmission module 310. As shown in FIG. 4, message transmission module 310 may include transmission logic 410 and prioritization logic 420.

Transmission logic 410 may route and deliver MTC data from MTCs 102 for M2M communications. Transmission logic 410 may receive MTC data from MTC 102 and separate messages from the access network into two branches (or constituent networks) of blended EPC network 100. Transmission logic 410 may send some MTC messages via a particular network (e.g., data intensive network 130) suited for voice and video and the other messages via a network designed to handle small messages (e.g., messages under a threshold size of 250 bites) with an intensity of number of transactions.

In one implementation, transmission logic 410 may separate messages based on application type associated with the MTC data (i.e., transmission logic 410 may separate the data to be transmitted without checking the size of the data). Transmission logic 410 may determine whether the MTC data is in a class required to be sent by the data intensive network 130. For example, transmission logic 410 may determine the constituent network that the message is to be transmitted on based latency and reliability requirements for the particular message, application, service or MTC 102. Transmission logic 410 may also determine routing for the MTC data based on whether the MTC data is sponsored data or consumer data. Transmission logic 410 may route the data among the constituent networks based on service level agreements associated with the source of the MTC data.

Prioritization logic 420 may define message prioritization for MTC data. Prioritization logic 420 may determine message prioritization based on different aspects and identifiers associated with the MTC data. Prioritization logic 420 may define the priority of the MTC data based initially on PLMN-ID, then access code and QCI. For example, the message priority may be determined based on access codes ranging from a highest priority emergency access code to a low priority access code. These access codes are assigned by operators to the devices associated with the operators. Prioritization logic 420 may determine intermediate codes based on different levels of access quality required for different applications and types of messages. Prioritization logic 420 may further determine the message priority based upon best efforts data associated with the application or MTC 102.

Prioritization logic 420 may determine the message priority based upon PLMN-IDs. Prime PLMN-ID may have majority resource partitioning, and highest priority while secondary PLMN-IDs may be defined with either lower or equal priority in radio resource assignment. Prioritization logic 420 may use various access codes in messaging aggregation network 170 to further differentiate various messages within each PLMN-ID. Prioritization logic 420 may further define various QCIs in data network to further differentiate various messages service within each PLMN-ID.

Figure 5:
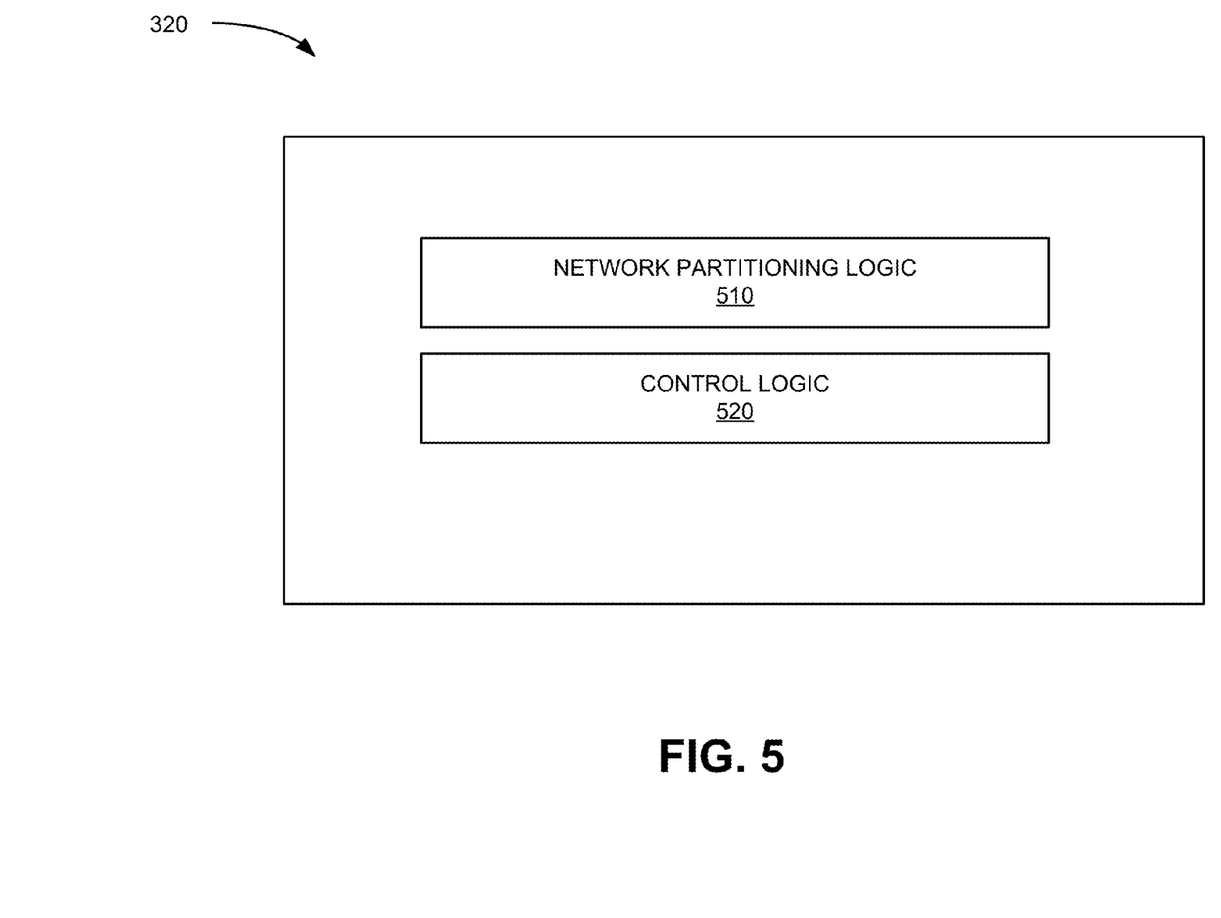
FIG. 5 depicts a functional block diagram of the network partitioning module of FIG. 3.

FIG. 5 is an exemplary functional block diagram of network partitioning module 320. As shown in FIG. 5, network partitioning module 320 may include network partitioning logic 510 and control logic 520.

Network partitioning logic 510 may perform network resource partitioning and congestion control based on radio resource usage. Network partitioning logic 510 may perform partitioning, congestion control and performance counter reporting. For example, network partitioning logic 510 may partition network resources based on the number of users (i.e., MTC s 102), the number of bearers, physical resource block (PRB) utilization, etc. Network partitioning may automatically be adjusted based on user and control plane usages among PLMN-IDs. Network partitioning logic 510 may statically define the partitioning or dynamically change the partitioning of network resources in response to changes in user and control plane usages among PLMN-IDs. Network partitioning may be controlled by an eNodeB scheduler (not shown). For example, the eNodeB scheduler may control admission, priorities, frequency, number of radio resource control (RRC) connection, or physical resource block allocations that may be assigned to MTCs 102.

Control logic 520 may control network congestion automatically through various timers, such as an extended waiting timer. The extended waiting timer may be used to delay access by MTCs 102 for MTC data and communications that are lower priority and for which immediate transmission of MTC data is not required. Control logic 520 may enact congestion controls by sending the message via the short messaging network 140 while implementing a paging and pulling schedule for the next access attempt. In some instances, control logic 520 may not monitor network all the time. Control logic 520 may poll MTCs 102 periodically or triggered by certain events, for example, when an MTC 102 device crosses or enters specific geo location, radio frequency (RF) condition, or Tracking Area boundary.

Figure 6:
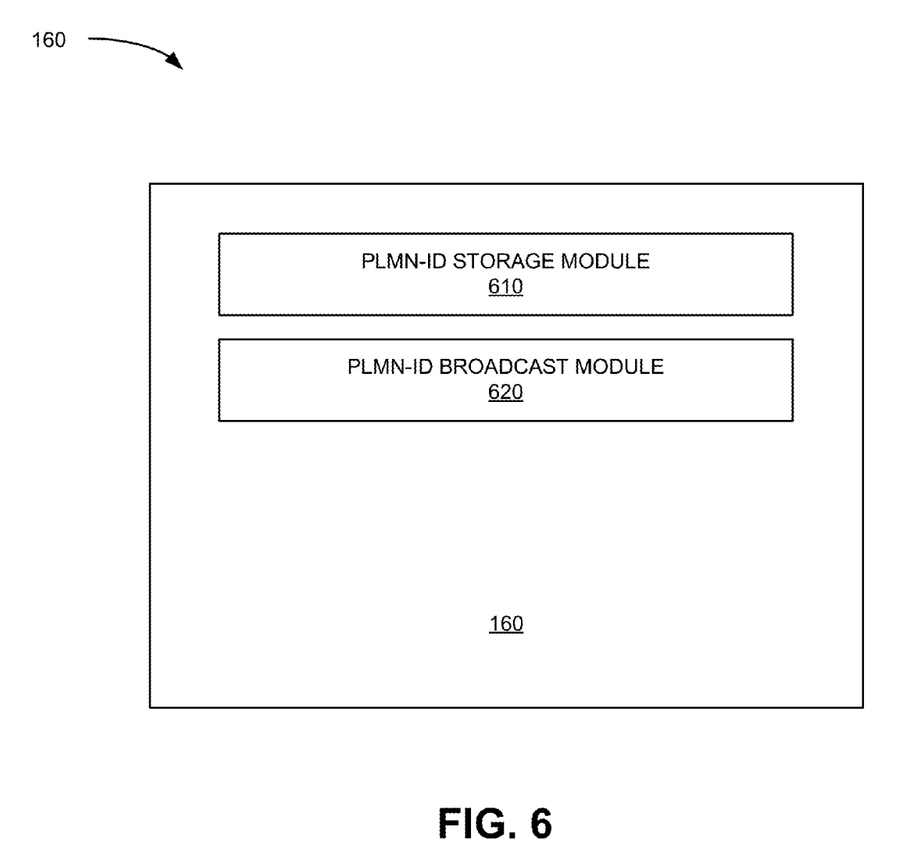
FIG. 6 is a diagram of exemplary functional components of the machine type communications (MTC) controller of FIG. 1.

FIG. 6 illustrates an exemplary functional block diagram of MTC controller 160. MTC controller 160 may include a PLMN-ID storage module 610, and a PLMN-ID broadcast module 620. The configuration of components of MTC controller 160 illustrated in FIG. 6 is for illustrative purposes only. Other configurations may be implemented. Therefore, MTC controller 160 may include additional, fewer and/or different components than those depicted in FIG. 6. FIG. 6 is discussed in conjunction with FIG. 7, which illustrates a PLMN list 710 for MTC 102.

MTC controller 160 may be located in messaging aggregation network 170. PLMN-ID storage module 610 may store PLMN-IDs for the PLMNs to which access is provided by the messaging aggregation network 170 for MTCs 102.

Figure 7:
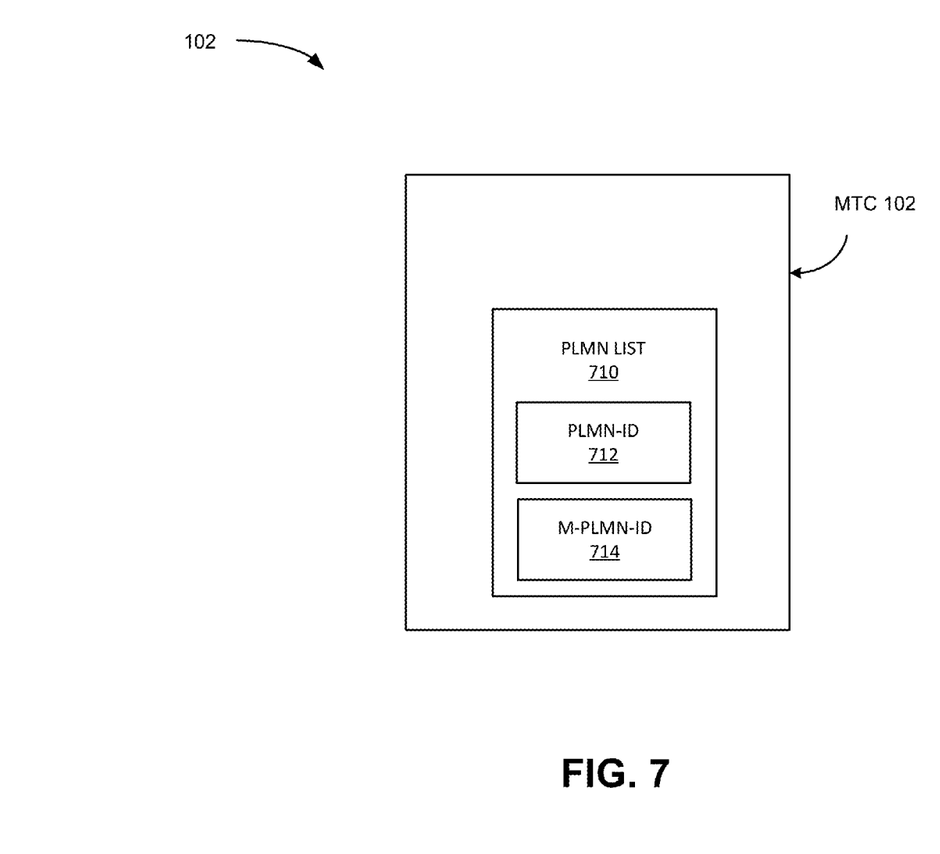
FIG. 7 is a diagram illustrating a machine type communications device including multiple Public Land Mobile Network (PLMN) identifiers (IDs) according to an implementation described herein.

As shown in FIG. 7, MTCs 102 may include a universal integrated circuit card (UICC) or SIM card on which a PLMN list 710 may be stored. PLMN list 710 may include a listing of PLMN-IDs for PLMNs to which MTC 102 is provided network access. These may include a PLMN-ID 712 associated with data intensive network 130 and an M-PLMN-ID 714 associated with short messaging network 140.

Referring back to FIG. 6, PLMN-ID broadcast module 620 may broadcast PLMN-ID 712 and MTC PLMN-ID 714. PLMN-ID broadcast module 620 may also provide the PLMN-IDs to intelligent eNodeB 110. In instances in which MTCs 102 attempt to transmit MTC data via intelligent eNodeB 110, intelligent eNodeB 110 may check to determine if the MTC 102 on PLMN-ID designated for M2M communication. Intelligent eNodeB 110 may broadcast a paging channel with a master information block (MIB) and receive the initial contact from MTC 102. MIB, which is defined by LTE standards, may consist of 24 bits representing different information and values including system bandwidth, Physical Hybrid-ARQ Indicator Channel (PHICH) information, system frame number and others. MTC 102 may contact intelligent eNodeB 110 via the paging channel broadcast by the intelligent eNodeB 110 with a request to transfer MTC data to a particular other MTC 102. Intelligent eNodeB 110 may allow MTC 102 to access the networks based on identification of the PLMN-ID provided by MTC 102.

Figure 8:
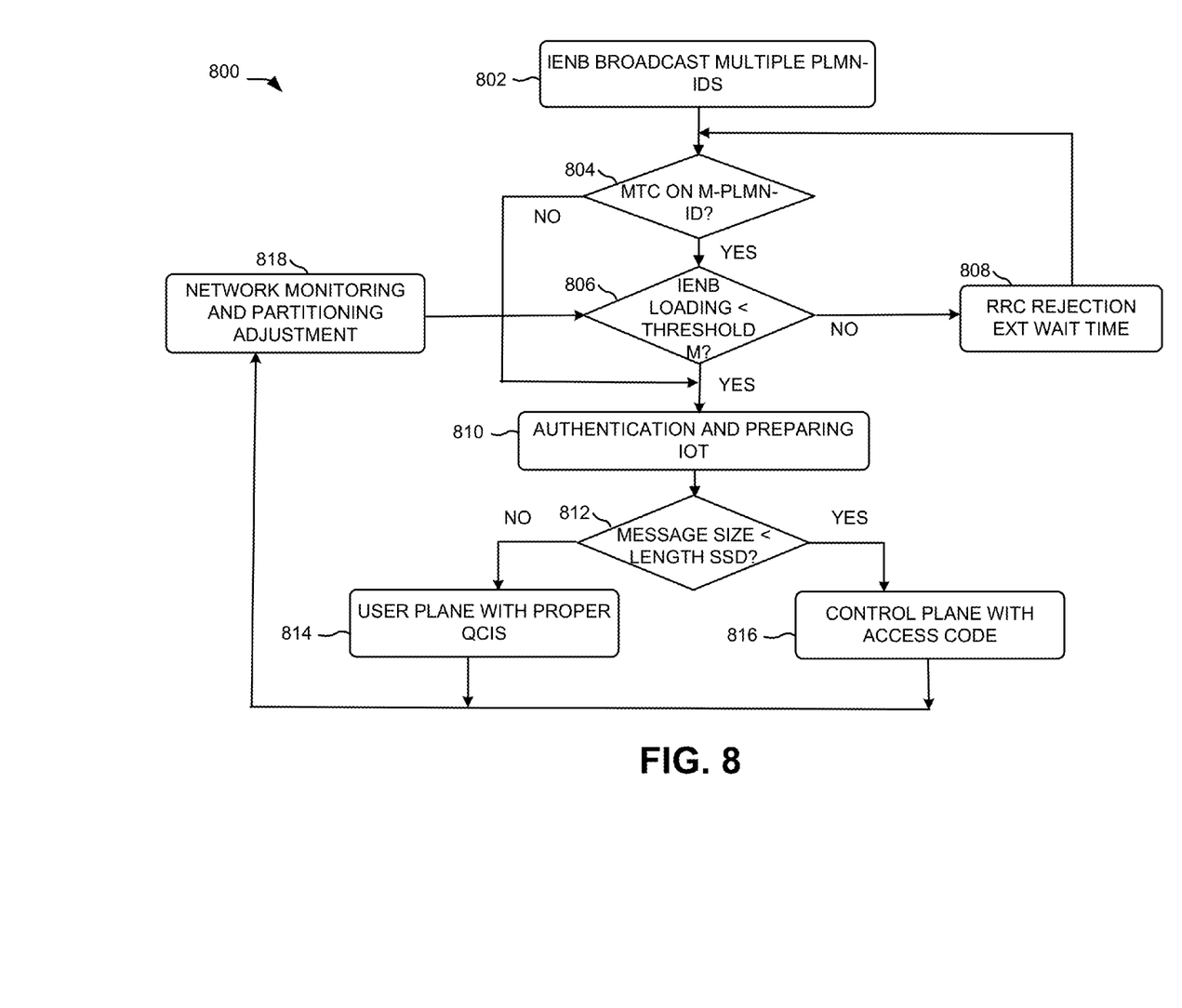
FIG. 8 is a flow chart of an exemplary process for data transmission for MTC in a blended data transmission network according to an implementation described herein.

FIG. 8 is a flow chart of an exemplary process for data transmission for machine type communications in a blended data transmission network according to implementations described herein. Process 800 is described with respect to intelligent eNodeB 110 shown in FIGS. 1 and 3, for illustrative purposes. In one implementation, process 800 may be performed by intelligent eNodeB 110. In another implementation, some or all of process 800 may be performed by another device or group of devices, including or excluding intelligent eNodeB 110.

As shown in FIG. 8, intelligent eNodeB 110 may broadcast multiple PLMN-IDs (block 802). Intelligent eNodeB 110 may broadcast PLMN-IDs associated with the constituent networks of blended EPC network 120 to provide radio access network (RAN) control in blended data transmission network. For example, intelligent eNodeB 110 may broadcast a PLMN-ID associated with a data intensive network 130 and an M-PLMN-ID (or a M2M communications PLMN-ID) associated with a short messaging network 140.

Intelligent eNodeB 110 may receive a request to transfer data from MTC 102. Intelligent eNodeB 110 may check whether communication from the MTC 102 includes an M-PLMN-ID (block 804).

In instances in which the MTC 102 includes the M-PLMN-ID (block 804—yes), intelligent eNodeB 110 may identify whether loading parameters for the network connection are lower than a threshold M, for M2M communications (block 806). Threshold M is a loading indication. Threshold M may be based on a total number of users, RRC connections, or UL interference level, or Physical Downlink Control Channel (PDCCH) and Physical Downlink Shared Channel (PDSCH)/Physical Uplink Shared Channel (PUSCH) utilization. For example, the number of RRC connection may be above 500 in a cell. The threshold M may be determined based on congestion control and loading conditions in blended EPC network 120.

If the loading parameters are not lower than the threshold M (block 806—no), intelligent eNodeB 110 may proceed to RRC rejection and extended waiting time for the MTC 102 (block 808). For example, MTC 102 devices may be configured with Delay Tolerant Access. This may be signaled to the RAN during RRC establishment and in NAS to MME 132, and forwarded to PGW (e.g., PGW 136). The value may be used by RAN and Core network to determine whether to accept connection request or not and also whether to return an extended wait timer value. In instances in which the network is congested, the RRC Connection Request may be rejected for those low priority MTC 102 devices, and an extended wait time value (i.e., the extendedWaitTime) may be included in the RRC Connection Reject message. However, if the loading parameters are lower than the threshold M (block 806—yes), intelligent eNodeB 110 may proceed to authentication of MTC 102 and preparing for M2M communication (e.g., such as IoT) (block 810).

At block 812, intelligent eNodeB 110 may determine whether the message size is less than the length of SSD and select different networks according to control message. The control message may indicate particular priority and network preferences associated with the message. When preparing for communication intelligent eNodeB 110 may check messaging size and if smaller than SSD (e.g., less than 250 kilobits) (block 812—yes) then intelligent eNodeB 110 may send the message via the short messaging network 140 (block 816). For example, intelligent eNodeB 110 may use control plane directly without establishing user plane. Intelligent eNodeB 110 may differentiate M2M via M-PLMN-ID. However, if messaging size is larger than SSD (block 812—no) then intelligent eNodeB 110 may send the message via the user plane with proper QCIs (e.g., via the data intensive network 130) (block 816).

In either instance, if the MTC 102 connects via data intensive network 130 or short messaging network 140, intelligent eNodeB 110 may send to network monitoring and partitioning adjustment (block 818). Network may monitor traffic, and adjust the partitioning accordingly. For example, if the number of connection is 400, 1% of resource may be used for MTC connections. In this instance the resource partitioning may be 4 versus 396 for MTC 102 devices vs consumer devices. Intelligent eNodeB 110 may check network loading conditions and if network loading conditions are high then intelligent eNodeB 110 may wait until the network is not congested (block 806).

Systems and/or methods described herein may provide a blended data transmission network that supports and routes M2M communications through different constituent networks of the blended data transmission network. The blended data transmission network may include a short messaging network for SSD that provides delivery of short message size MTC data and a data intensive network that may deliver large message size data.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
   broadcasting, from an evolved Node B (eNodeB), a plurality of Public Land Mobile Networks (PLMN) identifiers (IDs), wherein the plurality of PLMN-IDs include at least one PLMN-ID for a data intensive network and at least one M-PLMN-ID for machine type communications (MTC) in a short messaging network;
   receiving, by the eNodeB, a network connection request to transmit MTC data from an MTC device;
   determining, by the eNode B, whether the network connection request from the MTC device includes the at least one M-PLMN-ID;
   determining, by the eNodeB and responsive to a determination that the network connection request includes the at least one M-PLMN-ID and without determining a size of the MTC data, whether the MTC data is in a class required to be sent by the data intensive network;
   rejecting, by the eNodeB and responsive to a determination that the MTC data is in a class required to be sent by the data intensive network, the network connection request;
   determining, by the eNodeB and responsive to a determination that the MTC data is not in a class required to be sent by the data intensive network, a size of the MTC data;
   determining, by the eNodeB, whether the size of the MTC data is less than a length of structured small data (SSD); and
   establishing, by the eNodeB, a network connection and sending the MTC data via the short messaging network in response to a determination that the size of the MTC data is less than the length of the SSD.

2. The computer-implemented method of claim 1, further comprising:
   implementing network partitioning, congestion control and performance counter reporting via the plurality of PLMN-IDs.

3. The computer-implemented method of claim 1, further comprising:
   implementing network partitioning and congestion control via access codes associated with the MTC data.

4. The computer-implemented method of claim 3, wherein the access codes range from an emergency access code with a highest priority to a lower priority access code.

5. The computer-implemented method of claim 1, further comprising:
   transmitting the MTC data from the MTC device to at least one associated application server via a messaging aggregation network and at least one of the data intensive network, the short messaging network, and an access point.

6. The computer-implemented method of claim 5, wherein a data protocol for transmitting the MTC data via the messaging aggregation network is one of hypertext transfer protocol (HTTP), constrained application protocol (CoAP), extensible messaging and presence protocol (XMPP), message queue telemetry transport (MQTT), or data distribution service (DDS).

7. The computer-implemented method of claim 1, wherein determining whether the MTC data is in the class required to be sent by the data intensive network further comprises:
   determining whether to transmit the MTC data via the data intensive network based on at least one of a type of application or service.

8. The computer-implemented method of claim 1, wherein determining whether the MTC data is in the class required to be sent by the data intensive network further comprises:
   determining whether to transmit the MTC data via the data intensive network based on a latency and reliability requirement.

9. The computer-implemented method of claim 1, wherein determining whether the MTC data is in the class required to be sent by the data intensive network further comprises:
   determining whether the MTC data is sponsored or consumer data.

10. The computer-implemented method of claim 1, wherein sending the message via the short messaging network further comprises:
    controlling network congestion via at least one of a timer, or a paging and polling schedule for next access attempts.

11. An evolved NodeB (eNodeB) device in a blended data transmission network that includes a data intensive network and a short messaging network for machine type communications (MTC), comprising:
    a memory to store a plurality of instructions; and
    a processor configured to execute instructions in the memory to:
      broadcast a plurality of Public Land Mobile Networks (PLMN) identifiers (IDs), wherein the plurality of PLMN-IDs include at least one PLMN-ID for the data intensive network and at least one M-PLMN-ID for MTC in the short messaging network;
      receive a network connection request to transmit MTC data from an MTC device;
      determine whether the network connection request from the MTC device includes the at least one M-PLMN-ID;
      determine, responsive to a determination that the network connection request includes the at least one M-PLMN-ID and without determining a size of the MTC data, whether the MTC data is in a class required to be sent by the data intensive network;

reject, responsive to a determination that the MTC data is in a class required to be sent by the data intensive network, the network connection request;

determine, responsive to a determination that the MTC data is not in a class required to be sent by the data intensive network, a size of the MTC data;

determine whether the size of the MTC data is less than a length of structured small data (SSD); and establish a network connection and send the MTC data via the short messaging network in response to a determination that the size of the MTC data is less than the length of the SSD.

12. The eNodeB device of claim 11, wherein the processor is further configured to:

implement network partitioning, congestion control and performance counter reporting via the plurality of PLMN-IDs.

13. The eNodeB device of claim 11, wherein the processor is further configured to:

implement network partitioning and congestion control via access codes associated with the MTC data.

14. The eNodeB device of claim 13, wherein the access codes range from an emergency access code with a highest priority to a lower priority access code.

15. The eNodeB device of claim 11, wherein the processor is further configured to:

transmit the MTC data from the MTC device to at least one associated application server via a messaging aggregation network and at least one of the data intensive network, the short messaging network, and an access point.

16. The eNodeB device of claim 15, wherein a data protocol for transmitting the MTC data via the messaging aggregation network is at least one of hypertext transfer protocol (HTTP), constrained application protocol (CoAP), extensible messaging and presence protocol (XMPP), message queue telemetry transport (MQTT), or data distribution service (DDS).

17. A non-transitory computer-readable medium including instructions to be executed by a processor, the instructions including one or more instructions, when executed by the processor, for causing the processor to:

broadcast, from an evolved node b (eNodeB) device in a blended data transmission network that includes a data intensive network and a short messaging network for machine type communications (MTC), a plurality of Public Land Mobile Networks (PLMN) identifiers (IDs), wherein the plurality of PLMN-IDs include at least one PLMN-ID for the data intensive network and at least one M-PLMN-ID for MTC in the short messaging network;

receive a network connection request to transmit MTC data from an MTC device;

determine whether the network connection request from the MTC device includes the at least one M-PLMN-ID;

determine, responsive to a determination that the network connection request includes the at least one M-PLMN-ID and without determining a size of the MTC data, whether the MTC data is in a class required to be sent by the data intensive network;

reject, responsive to a determination that the MTC data is in a class required to be sent by the data intensive network, the network connection request;

determine, responsive to a determination that the MTC data is not in a class required to be sent by the data intensive network, a size of the MTC data;

determine whether the size of the MTC data is less than a length of structured small data (SSD); and establish a network connection and send the MTC data via the short messaging network in response to a determination that the size of the MTC data is less than the length of the SSD.

18. The non-transitory computer-readable medium of claim 17, wherein the instructions further include instructions for causing the processor to:

implement network partitioning, congestion control and performance counter reporting via the plurality of PLMN-IDs.

19. The non-transitory computer-readable medium of claim 17, wherein the instructions further include instructions for causing the processor to:

implement network partitioning and congestion control via access codes associated with the MTC data.

20. The non-transitory computer-readable medium of claim 19, wherein the access codes range from an emergency access code with a highest priority to a lower priority access code.

* * * * *